United States Patent
Schneider

(10) Patent No.: US 9,528,818 B2
(45) Date of Patent: Dec. 27, 2016

(54) CONTROL METHOD FOR PRODUCING GROUND MARKINGS, AND REFERENCE BEAM GENERATOR

(71) Applicant: LEICA GEOSYSTEMS AG, Heerbrugg (CH)

(72) Inventor: Klaus Schneider, Dornbirn (AT)

(73) Assignee: BEAMRIDER LIMITED, Malvern (GB)

( * ) Notice: Subject to any disclaimer, the term of this patent is extended or adjusted under 35 U.S.C. 154(b) by 279 days.

(21) Appl. No.: 13/781,323

(22) Filed: Feb. 28, 2013

(65) Prior Publication Data
US 2013/0167385 A1    Jul. 4, 2013

Related U.S. Application Data

(62) Division of application No. 12/597,026, filed as application No. PCT/EP2008/003458 on Apr. 29, 2008, now Pat. No. 8,404,301.

(30) Foreign Application Priority Data

May 4, 2007 (EP) .................................... 07107521

(51) Int. Cl.
*G01B 11/00* (2006.01)
*A63C 19/06* (2006.01)

(52) U.S. Cl.
CPC ................ *G01B 11/00* (2013.01); *A63C 19/06* (2013.01); *A63C 2019/067* (2013.01)

(58) Field of Classification Search
CPC ......... G01B 11/272; G01B 15/00; G01B 5/25; G01B 11/00; Y10S 33/21; G01C 15/004; G01C 15/00

USPC ......................................... 33/286; 359/213.1
See application file for complete search history.

(56) References Cited

U.S. PATENT DOCUMENTS

| 4,353,617 A | * | 10/1982 | Tokumitsu | G02B 13/22 |
| | | | | 359/221.1 |
| 4,651,169 A | * | 3/1987 | Muka | G02B 26/126 |
| | | | | 347/261 |
| 4,776,335 A | * | 10/1988 | Nakanishi | A61F 9/008 |
| | | | | 606/17 |
| 5,121,160 A | * | 6/1992 | Sano | G03F 7/70058 |
| | | | | 355/53 |

(Continued)

FOREIGN PATENT DOCUMENTS

CH     520977    3/1972
DE    4013950    11/1991
(Continued)

*Primary Examiner* — Yaritza Guadalupe-McCall
(74) *Attorney, Agent, or Firm* — Maschoff Brennan

(57) ABSTRACT

The invention relates to a control method for producing ground markings, with a reference beam generator for determining a reference plane, a reception of the reference beams by means of an optical detector, wherein the position of an application unit for the marking substance can be derived relative to the reference plane by using the received reference beams, a derivation of the orientation relative to the reference plane, and a control of an application of the marking substance to produce ground markings according to the orientation. According to the method, the intensity in the solid angle covered by the reference beam is varied in time during the production of the marking.

9 Claims, 6 Drawing Sheets

(56) References Cited

U.S. PATENT DOCUMENTS

| | | | | |
|---|---|---|---|---|
| 5,166,820 A * | 11/1992 | Fujita | ............... | G01B 11/00 235/462.35 |
| 5,289,001 A * | 2/1994 | Arimoto et al. | ............... | 250/236 |
| 5,613,442 A | 3/1997 | Ahola et al. | | |
| 5,825,555 A * | 10/1998 | Oono | ............... | G01C 15/004 356/149 |
| 5,838,431 A * | 11/1998 | Hara | ............... | G01C 15/004 33/290 |
| 5,978,148 A * | 11/1999 | Oono | ............... | G01C 15/004 250/201.5 |
| 6,421,163 B1 * | 7/2002 | Culver | ............... | G02B 27/46 359/237 |
| 6,526,089 B1 * | 2/2003 | Haeno | ............... | G02B 27/09 219/121.58 |
| 6,796,040 B2 * | 9/2004 | Ohtomo | ............... | G01C 15/004 33/227 |
| 6,982,410 B2 * | 1/2006 | Oikawa et al. | ............... | 250/221 |
| 2003/0227660 A1 * | 12/2003 | Kim | ............... | 359/205 |
| 2006/0100524 A1 * | 5/2006 | Lucassen et al. | ............... | 600/476 |
| 2007/0062053 A1 * | 3/2007 | Walser | ............... | G01C 15/004 33/286 |
| 2010/0129541 A1 * | 5/2010 | Schneider | ............... | A63C 19/06 427/137 |
| 2013/0265554 A1 * | 10/2013 | Baranec | ............... | G02B 26/06 353/88 |

FOREIGN PATENT DOCUMENTS

| | | |
|---|---|---|
| DE | 19733491 | 2/1999 |
| EP | 1703300 | 9/2006 |
| EP | 05108174.3 | 3/2007 |
| EP | 06101449.4 | 8/2007 |
| WO | WO2006/013386 | 2/2006 |

* cited by examiner

CONTROL METHOD FOR PRODUCING GROUND MARKINGS, AND REFERENCE BEAM GENERATOR

CROSS-REFERENCE TO RELATED APPLICATIONS

This application is a divisional of U.S. patent application Ser. No. 12/597,026, filed Oct. 22, 2009, titled CONTROL METHOD FOR PRODUCING GROUND MARKINGS, AND REFERENCE BEAM GENERATOR, which claims priority as a 371 application of PCT/EP2008/003458, filed Apr. 29, 2008, which claims priority to European Application No. 07107521.2, filed May 4, 2007, all of which are incorporated herein by reference in their entireties.

FIELD OF THE INVENTION

The invention relates to a control method for producing ground markings and a reference beam generator for producing an electromagnetic reference beam.

BACKGROUND

Marking devices are used for producing ground markings as are used, for example, for defining playing fields and sports fields. The marking devices have an outlet for marking substance and are generally formed as mobile marking trucks. Before the beginning of the actual marking activity, the field or the lines and/or areas to be marked must be staked out in a defined manner. For example, it is known that the marking region can be defined for this purpose by optical guide beams. Thereafter, an operator guides or drives the marking truck, emitting marking substance, along the guide beams.

Such a system is described, for example, in WO 2006/013386. A beam having fan-shaped geometry and elliptical beam cross-section is produced by a laser diode and an optical system. This beam is emitted for defining one side of a sports field. The marking truck used for applying the marking substance has a detector for the laser radiation, the position of the marking truck relative to the vertically oriented beam being displayed. The user of the truck can guide the latter on the basis of the laser fan as a guide beam. The laser fan defines a reference plane, relative to which the marking is effected.

DE 40 13 950 A1 discloses a solution in which the guide line is formed by a laser beam. In trade fair halls and on parking areas and playgrounds, a vehicle having a firmly mounted application element is set to move automatically along the laser beam and to apply markings to the ground area according to a specifiable marking programme, depending on the distance covered. The distance covered is determined by detecting the revolutions of a measuring wheel.

The laser guide beam is aligned from the first end of the guide line by means of an adjustable holder with an adjusting plate arranged at the second end of the guide line. After the alignment of the laser beam, a vehicle having a receiver is guided along the beam. The receiver uses a two-dimensional array of photodiodes to determine the deviation of the vehicle from the guide beam. According to the detected lateral deviation, a corrective steering movement of the vehicle is triggered.

In order to be able to dispense with the complicated vehicle control, the European Patent Application with the application number EP 06101449.4 describes a solution in which the attitude of the application element relative to the vehicle can be laterally adjusted by the holder. A receiver firmly connected to the application element detects a deviation of the attitude of the application element from the guide beam, the inclination of the vehicle additionally being measured. The deviation is compensated with a lateral displacement of the application element relative to the vehicle by the holder. To ensure that the vehicle does not deviate from the guide line to such an extent that the compensation by the holder is no longer sufficient, reference is also made to the necessary course correction of the vehicle.

Vertical irregularities of a playing field might result in the laser beam impinging vertically above or below the receiver. In order to avoid a signal loss associated therewith, a laser beam expanded or extended vertically in a fan-like manner is used as a signal beam, it being possible, for example, for the opening angle to be about 1 to 2 degrees.

U.S. Pat. No. 5,613,442 discloses a solution for correcting the lines of tracks. An optical reference beam is detected by a position-sensitive receiver arranged on a railway vehicle. According to the detected line of the reference beam, the line of the track is adjusted by a work element. The inclination is detected by means of a tilt sensor and the longitudinal position of the railway vehicle is detected by means of an odometer. If the rail rises or falls slightly, a reference beam extended vertically in a fan-like manner is used.

For expanding a laser beam in one direction, a concave cylindrical lens is used in DE 197 33 491 A1 and a convex cylindrical lens in U.S. Pat. No. 6,796,040. In the beam extended in a fan-like manner, the luminous intensity decreases with the increasing beam width or increasing distance. At distances with an intensity which is too low, the receiver cannot determine a position signal.

The European Patent Application with the application number EP 05108174.3 describes a reference beam generator for guiding a marking truck for ground markings. This has a support element which can be positioned in a defined manner relative to the Earth's surface, a laser diode and beam guidance means for the emission of the radiation to at least one reference target, the radiation being emitted with an asymmetrical beam cross-section, in particular in a fan-like manner, and the beam guidance means being adjustable in a defined manner relative to the support element. An alignment of the radiation with the reference target can be effected by an optical detection component for detecting and providing the radiation reflected by the reference target, in particular a telescope.

In order to define a reference plane in the case of these known systems, the radiation is therefore emitted in a fan-like manner so that a plane is defined in space by the beam cross-section and the direction of propagation. However, as a result of the fan-like configuration or the elliptical beam cross-section resulting therefrom, the intensity of the radiation which is received or can be received by the detector decreases in comparison with a small beam cross-section which is not fan-like. This reduction of the received intensity by beam divergence is evident in particular in the case of relatively large distances. The maximum beam intensity is generally limited by technical circumstances, such as, for example, the maximum power of an individual laser diode, or other circumstances, such as, for example, by laser protection requirements.

The disadvantage of the known solutions is that asymmetry of the beam cross-section must be produced for producing the reference plane, with the result that intensity of the radiation decreases so that, depending on the distance, a position signal can often no longer be determined. If on the other hand the beam cross-section is kept small, for example, the orientation of the plane can no longer be determined or cannot be determined sufficiently accurately or the laser beam no longer impinges on the receiver or does so only with a very small part of the beam cross-section.

SUMMARY

It is the object of the invention to provide a solution which makes it possible to detect the attitude of the receiver relative to the guide line or the guide beam along a total guide line even in the case of large ground areas which are to be marked and which are uneven.

Where a light beam or beam is mentioned in the following description of the invention, this does not imply a limitation to visible light. Although the term light beams comprises in particular the visible spectral range, according to the invention, however, other ranges of the electromagnetic radiation which can be used in optical surveying instruments are also included over and above this. Light beams in the form of laser beams are preferably used.

The solution according to the invention is based on the separation or variation of certain optimized beam properties as a function of time. By dividing the properties desired in each case over specific time segments, in which an optimization with regard to the plane projection or the intensity and hence the receivability is then affected, the requirements which are contradictory per se can be combined. If the beam intensity in the case of a receiver which is a distance away vertically from the guide line is variable as a function of time for detecting the attitude of the receiver relative to the light beam, the attitude determination can be carried out by the receiver along the total guide line, in each case in phases with as high a light intensity as possible.

In order to be able to determine the attitude of a receiver relative to the beam, the receiver has photosensitive sensors at least in a direction transverse to the plane of the beam fan. In achieving the object, it was recognized that, in the case of a light beam which is extended in one direction and is to produce a signal at a receiver, the intensity of the beam at the receiver must be above the sensitivity limit of the sensors of the receiver. The maximum distance at which the attitude can still be detected depends on the power of the light or laser source, the beam divergence and the sensitivity of the sensors.

The power of the laser source is limited by the fact that no damage to the eyes must occur on accidental eye contact. The necessary vertical beam divergence is specified by the vertical region within which the receiver can lie during application of the marking. The useable sensor sensitivity depends inter alia on the extent to which stray light is excluded from producing false sensor signals. For optimizing the beam shape, the region in which an attitude determination is possible can be substantially enlarged.

The vertical region within which the receiver can lie during application of the marking depends on the topography of the ground area to be marked. In the case of playing fields, both small-volume irregularities and large-volume deviations from a flat surface occur. In the case of a beam extended in a fan-like manner in a vertical direction, the vertical region which is covered by the beam increases linearly with increasing distance. If the angle of divergence of the beam is chosen so that it impinges on the receiver in the near region even in the case of a maximum small-volume level deviation of the ground area, it is generally further expanded in the far region than would be required in the case of customary topographies.

The solution according to the invention envisages configuring the beam with variability as a function of time so that the attitude determination by the receiver can be realized along the total guide line, depending on distance, in each case with as high a light intensity as possible. For this purpose, in the case of receiver positions which are a vertical distance away from the guide line, the light intensity should vary periodically and the position determination should be carried out in phases with sufficiently high intensity. These phases with sufficiently high intensity are possible because an intensity which is constant as a function of time is dispensed with. For achieving the periodic intensity variations, embodiments which can also be combined with one another are subsequently described purely by way of example. In particular, in addition to the refractive optical components described, it is also possible to use reflective ones, and gradient-optical or holographic components of the same or supplementary functionality. Apart from individual optical components, combined optical systems can also be used according to the invention for achieving the desired optical properties.

For ground areas whose vertical deviations over the total region to be marked are within a fixed lower limit and a fixed upper limit, a vertically extended laser beam having substantially constant beam divergence can be used. The receiver can be formed in such a way that it makes the attitude of the laser beam detectable over a specified receiver height region.

If the vertical position of the beam were to be exactly centred between the centre of the minimum and of the maximum receiver height, half the vertical receiver region and the vertical beam divergence together would have to correspond to the maximum vertical deviation of the ground area. If the centre of the beam were to lie at the minimum or the maximum receiver height, the total vertical receiver region and half the vertical beam divergence together would have to correspond to the maximum vertical deviation of the ground area.

At the beginning of a marking process, the exact attitude of the beam relative to the permissible vertical region of the receiver is not known and the ground area may deviate more than expected from the desired height. In order nevertheless always to ensure impingement of the beam on the receiver with a constant vertical beam divergence, the beam would have to be formed unnecessarily high. Because problems arise with a constant vertical beam divergence, according to a first embodiment the optical system is formed in such a way that the vertical beam width of a collimated beam varies periodically between a maximum and a minimum beam width. Simultaneously, the horizontal beam width can also be varied.

By making the vertical beam divergence larger and smaller, the attitude determination can be carried out by the receiver along the total guide line for all vertical deviations of the ground area, in each case with as high a light intensity as possible.

In order to achieve a vertically extended beam having a substantially constant beam divergence, a laser beam having a circular cross-section can be expanded in the vertical direction with a lens. In the region of the desired vertical divergence, an exit beam having a low divergence or having light propagation substantially parallel to the beam axis over the total vertical dimension is produced with a collimator element, starting from the expanded entry beam or using a source divergence present in any case. Owing to the limited size of the transmitting apertures, as a rule a divergence of the beam and hence the from the known fan-like geometry are used. According to the invention, this light fan expanded to the maximum does however represent only a time-limited state, whereas other beam cross-sections are produced at other times.

For producing a beam height variable as a function of time, first a divergence element and then the collimator element are therefore used in the beam path. With a movement of the collimator element away from the divergence element and towards said divergence element, the beam width and hence the beam cross-section can be varied.

A beam emerging from the collimator element has, at the exit, an intensity which is reduced in comparison with the laser source. The power of the laser source used can be chosen so that the intensity per unit area in the emerging beam is just permissible for eye contact. This gives a vertically extended beam having maximum intensity. Because the intensity in the beam decreases only minimally with distance owing to the small divergence, the receiver can carry out the attitude determination over a large distance range.

In order to reduce the required power of the laser source, for example, a receiver having a plurality of sensor lines arranged vertically one on top of the other is used. With the increase in the vertical receiver region, the vertical beam region and hence the required power of the laser source can be reduced.

The disadvantages of the fan-like divergence of the laser beam which is known from the prior art can optionally be reduced by the specific choice of the divergence angle. When establishing the divergence angle, it must be decided whether optionally signal losses in the near range—due to irregularities—or in the far range—owing to the excessively low intensity—are to be accepted at the receiver. Because the optimization of the angle depends on the topography of the respective ground area, it is suitable only to a limited extent for a solution which can be widely used.

In order to carry out the attitude determination by the receiver along the total guide line in each case with as high a light intensity as possible, the beam divergence can be varied as a function of time. For this purpose, the vertical opening angle of the beam is increased starting from a narrow beam. As soon as the ascending beam height impinges on a sensor at the receiver, the sensor detects the impingement of the beam. On the basis of the attitude of the sensor which detects the beam, the attitude of the beam relative to the receiver can be determined.

On further divergence of the beam, the intensity of the beam at the sensor may decrease to such an extent that the sensor can no longer detect the impingement of the beam. After reaching the maximum divergence angle of the beam, this angle is reduced again until a narrow beam is obtained. If the intensity of the narrowing beam is sufficient to trigger the detection of the beam at the sensor, the sensor establishes the impingement of the beam until the narrow beam no longer impinges on the sensor.

In addition to the movement of a lens in the optical beam path in the direction of the optical axis, opening and closing of the divergence angle can be achieved, for example, by stepwise insertion of other or additional lenses or curved mirrors into the beam path or removal of them again.

The working examples illustrated in more detail in the figures can be realized with spherical or aspherical and convex or concave lens types. Thus, for example, it is possible to use an aspherical lens whose curvature increases from the centre upwards and downwards towards its border, preferably substantially no curvature being present in the centre. If this lens, for example also a cylindrical lens, is moved along the axis of a beam whose cross-section varies along the axis, the beam impinges only on the central region of the lens at one end position of the lens and also on the edge region of the lens at the other end position. Accordingly, the movement of the lens between the two end positions leads to a beam whose vertical divergence varies between a minimum and a maximum angle.

According to another possibility for realization, the beam direction is varied as a function of time along the guide line in a plane substantially vertical relative to the guide beam, in order to carry out the attitude determination by the receiver along the total guide line in each case with as high a light intensity as possible. The guide line thus corresponds to one of the main axes of the elliptical beam cross-section for an expanded beam. In order for the beam periodically to impinge on the receiver independently of the vertical position thereof, the beam axis is swiveled up and down instead of the beam undergoing a vertical divergence. Thus, the beam retains substantially the same intensity along the guide line and the sensors thus also respond to the beam at larger distance.

Variable, for example pivotable or deformable, mirrors or lenses and corresponding combinations of such elements can be used for the various possibilities for realizing the beam by swiveling or divergence. If the beam is to be slightly expanded and also swiveled, this can be achieved, for example, by the coordinated tilting and retraction of the lenses of a divergence optical system and of an alignment optical system.

A vertical plane can be defined by a vertically extended beam having a small divergence, a beam divergent in a fan-like manner in the vertical plane or a beam swiveled up and down in the vertical plane and having a small cross-section. If the receiver comprises a two-dimensional arrangement of sensors, the tilt of the receiver relative to the vertical plane can also be determined in addition to the horizontal position of the receiver relative to the guide line, the vertical plane being substantially perpendicular to the plane with the sensors.

The sensors are preferably arranged in a two-dimensional grid. The beam intensities detected by the sensors within a time interval are evaluated so that the lateral tilt and a horizontal position of the beam relative to the grid can be derived. If the first tilt angle relative to the horizontal alignment and determined as a lateral tilt is substantially vanishingly small, the sensor plane is perpendicular to the vertical plane. In order to determine whether the sensor plane is vertically oriented or is tilted by a second tilt angle about a horizontal axis oriented perpendicularly to the guide line, the phase differences occurring in the case of the sensors can also be evaluated.

If the first and/or second tilt angle is not vanishingly small, the application element is not perpendicular above the point which is derived from the horizontal position determined by the receiver without tilt correction. Without tilt correction, only the horizontal offset between receiver and application element is taken into account. In a tilt position of the marking truck, the horizontal offset is slightly changed. If one or both tilt angles are known, a tilt correction of the marking position can be calculated starting from the distance of the application element above the ground area and can be taken into account for controlling the marking device.

If the receiver can transmit information to the control of the device for producing the laser beam, it is expedient to adjust the control of the beam for optimizing the reception. For example, in the case of an increase in the vertical beam divergence, the increase can be stopped if the desired position signal is determined. Analogously, the swiveling up and swiveling down of a narrow beam can be limited to an angle range about the actual receiver position.

If the receiver acquires information about the distance between receiver and source of the laser beam, the maximum divergence angle can be set according to the actual distance in the case of a beam expanded in a fan-like manner. At a large distance, the maximum angle may be chosen to be smaller than in the case of a small distance since height variations at a large distance are associated with smaller angular changes.

BRIEF DESCRIPTION OF THE DRAWINGS

The drawings illustrate the control method according to the invention for producing ground markings and the reference beam generator according to the invention with reference to working examples shown purely schematically.

DETAILED DESCRIPTION OF THE INVENTION

Figure 1:
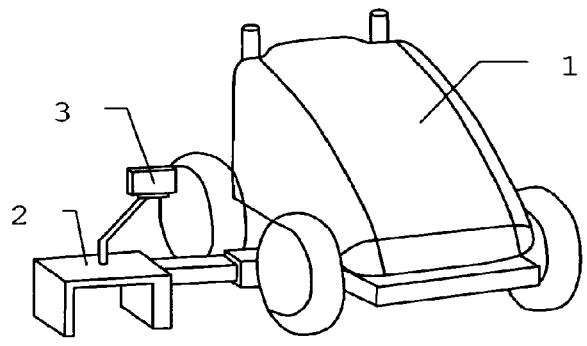
FIG. 1 shows a generic marking truck for producing ground markings.
Figure 2:
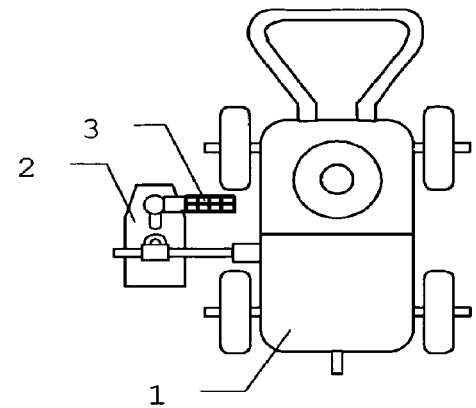
FIG. 2 shows the generic marking truck in plan view.

FIG. 1 shows a generic marking truck 1 for producing ground markings in lateral view and FIG. 2 in plan view. The marking truck 1 has a laterally arranged application unit 2 and a CCD area array as optical detector 3. The optical detector 3 determines the position of the marking truck 1 or the application unit 2 relative to a reference plane defined by a reference beam as a guide beam. As a result of a controlled movement along the guide beam, lines for markings on playing fields or similar structures can be applied. The application unit 2 for the required marking substances has a housing in which electronics for processing the detector/sensor outputs and for providing instructions for controlling the application unit 2 is arranged. The optical detector 3 serves for relative attitude determination. By means of the electronics, position values determined are evaluated with respect to reference values and optionally compensation values are determined and provided. In the case of deviations of the position values from the reference values, a change in position of the outlet for the marking substance on the basis of the compensation values is effected via the electronics and an actuator device in the application unit 2. If appropriate, stopping—and resumption—of the marking process is also effected. With orientation of the marking truck 1 during marking of surfaces to a predefined reference plane, the marking process can therefore be carried out in an automated manner with high accuracy.

Figure 3:
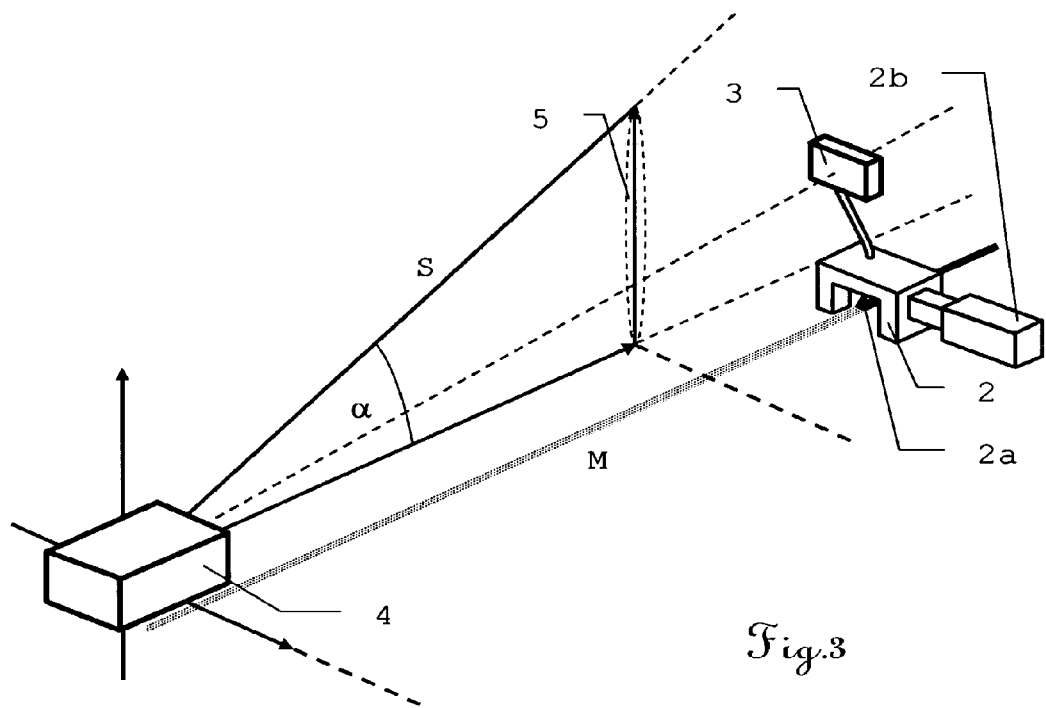
FIG. 3 shows a schematic diagram of methods of the prior art for controlling marking trucks.

FIG. 3 illustrates a method of the prior art for controlling such a marking truck. A reference beam generator 4 produces, as a guide beam, a laser beam S expanded vertically in a fan-like manner with an opening angle $\alpha$. This guide beam having an elliptical cross-section 5 or beam profile defines, by the main axis of its ellipse, a fan-like reference plane in which the marking truck is to move and along which a ground marking M is to be produced. The laser beam S as a guide beam is detected by the optical detector 3 and a deviation from the reference plane is compensated by means of an actuator device 2b which moves the application control unit 2 and the position of the outlet 2a for marking substance. According to the determined relative attitude of the application unit 2, control instructions for attitude adjustment of the application unit 2 are generated by the electronics, the attitude being appropriately adjustable by means of an actuator device 2b. In addition, an inclination relative to the plane can be determined from the linear divergence of the laser beam S, so that inclination-related errors can also be taken into account.

Figure 4:
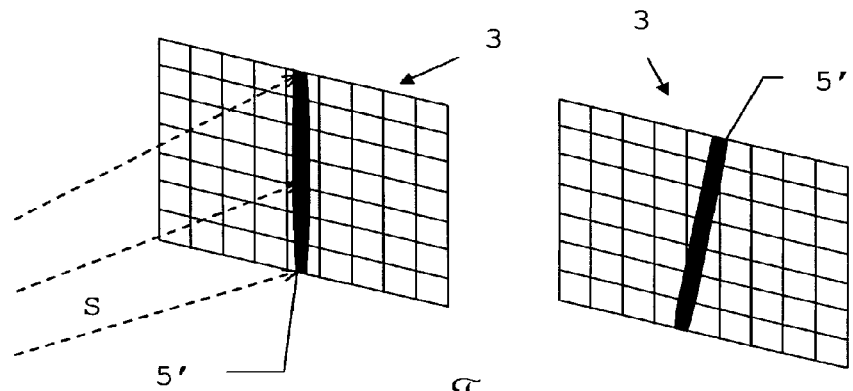
FIG. 4 shows a schematic diagram of the fan-like guide beam of methods of the prior art.

The detection of the fan-like laser beam S by the optical detector 3 is illustrated schematically in FIG. 4. In the left situation, it is evident from the focusing 5' of the elliptical cross-section of the laser beam S on the CCD area sensor used as optical detector 3 that the sensor area is oriented perpendicularly to the main axis of the profile of the laser beam S as a reference. Movements caused by the marking truck lead to a shift of the focusing 5' on the detector 3. Owing to the ground conditions of most surfaces to be marked, deviations to the side are more relevant than deviations in height, so that precise guidance is possible by a vertically oriented laser fan. For specific applications, however, other orientations of the laser fan or a plurality of laser fans oriented relative to one another can also be used.

In the right example, the focusing 5' of the reference beam on the detector 3 has migrated from its central vertical position, and the sensor area is therefore inclined relative to the reference beam axis and slightly shifted. Such focusing 5' of the laser beam S is obtained, for example, when the detector 3 or the application control unit—with reference to the above statements—is inclined transversely to the direction of travel.

Figure 5:
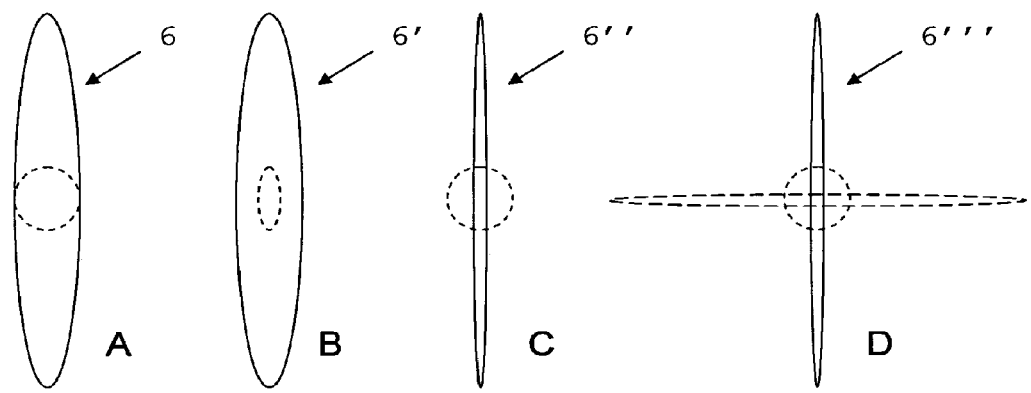
FIG. 5 A-D show a schematic diagram of alternatives according to the invention for varying a guide beam cross-section in a control method according to the invention.

The configuration according to the invention of alternatives of the variation of a guide beam cross-section in a control method according to the invention is shown schematically in FIG. 5 A-D.

In FIG. 5A, the beam cross-section 6 is varied in one dimension as a function of time. Starting from a circular or point-like beam cross-section, the latter is expanded to an ellipse and then reduced again to its original cross-section, so that the first opening angle of the emission is varied periodically between a maximum and a minimum opening angle. In many applications, the emission is effected with a beam cross-section extended vertically in a fan-like manner along a beam axis of the electromagnetic reference beam, so that the vertical opening angle varies as a function of time. The transition from fully expanded ellipse to the circle can take place discontinuously or continuously, for example with a variation which is sinusoidal overall.

FIG. 5B shows a variation of the beam cross-section 6' as a function of time in two dimensions. Here, an elliptical beam cross-section 6' is retained and is increased in size by extension of the main axes, it being possible for the ratio thereof to remain constant or likewise to vary as a function of time, in which case a first and second opening angle are varied to different extents, i.e. for example with variable ratio. In comparison with the example from FIG. 5A, a second opening angle of the emission is varied here. Such a variation is expedient, for example, if it is also intended to be able to derive a direction from the beam and hence a relative orientation of the detector even at minimum cross-section.

In FIG. 5C, a variation of the beam cross-section 6'' in two dimensions as a function of time occurs, but the originally circular cross-section is increased in one dimension but reduced in the other dimension so that, with the same intensity, a greater longitudinal divergence can be achieved than in the case of an unchanged width of the ellipse.

FIG. 5D likewise shows a variation of the beam cross-section 6''' in two dimensions as a function of time, the two end or extreme states each being elliptical and being oriented at right angles to one another. The circular cross-section is passed through as an intermediate state. Such a variation has the advantage of an exact definition of two reference planes, which may be relevant, for example, if both avoidance of height deviations and of lateral deviations is required.

Figure 6:
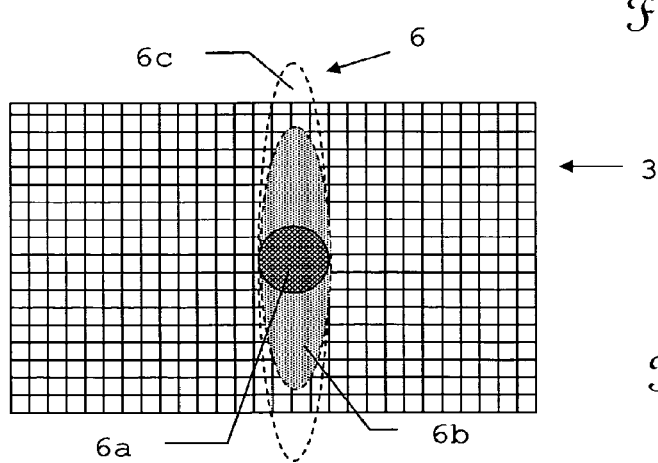
FIG. 6 shows a schematic diagram of the variation of a laser beam cross-section on a detector of a marking truck.

FIG. 6 illustrates the effect of a variation of a guide beam cross-section 6 on a detector 3 of a marking truck for the working examples shown in FIG. 5A. In the state of minimum expansion, beam cross-section 6a has circular geometry and hence the highest intensity, so that a signal can still be provided by the detector 3 even at relatively large distances. With increasing divergence in the vertical direction, the intensity decreases until it finally falls below the detection threshold at larger distances. The beam cross-section 6c expanded to the maximum can no longer be detected. In the intermediate region between the beam cross-section 6a of circular geometry and the beam cross-section 6c expanded to the maximum, a beam cross-section 6b is passed through which can just still be detected and evaluated. This therefore simultaneously has the maximum detectable vertical divergence and thus provides maximum precision with regard to the horizontal positioning. By continuously varying the beam cross-section, the receivability of direction information with distance-dependent but nevertheless maximum accuracy in each case is thus ensured.

Figure 7:
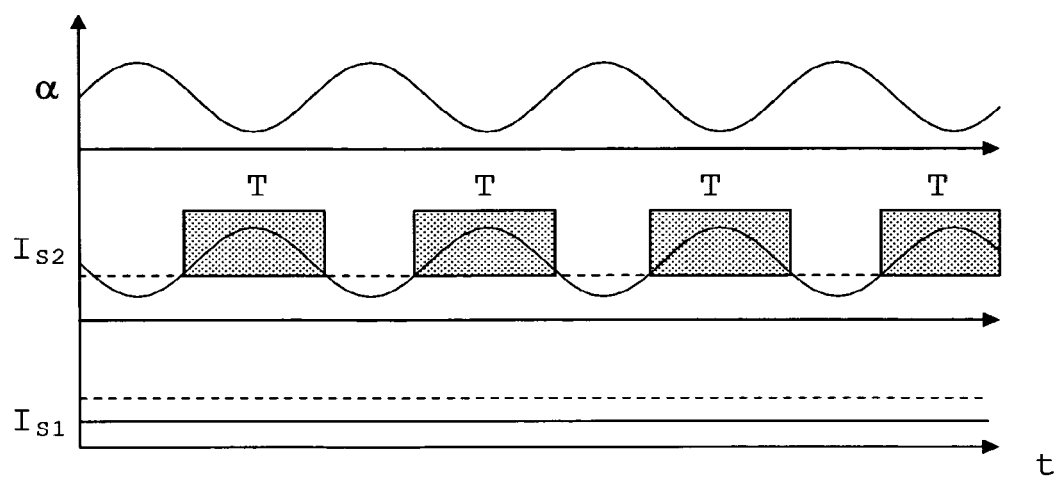
FIG. 7 shows a diagram of the variation of the beam cross-section as a function of time for a reference beam generator according to the invention.

FIG. 7 shows the beam cross-section for a reference beam generator of the prior art and a reference beam generator according to the invention. The beam intensities $I_{s1}$, of the reference beam generator of the prior art (bottom) and $I_{s2}$ of a reference beam generator according to the invention (middle), which beam intensities are registered by an optical detector, and the opening angle α of the emission of the reference beam (top) are plotted. In the situation shown here, where a certain maximum distance is exceeded, the intensity $I_{s1}$ of the reference beam generator of the prior art, which is indicated by a solid line, falls below the threshold value for a detection, which is shown by a dashed line. On exceeding this maximum distance, a system of the prior art therefore permanently loses the reference beam.

In the middle, the situation for a reference beam generator according to the invention is illustrated. The intensity $I_{s2}$ indicated by a solid line varies sinusoidally as a function of time, with the opening angle α of the emission indicated above. For the time spans T, the intensity $I_{s2}$ is above the threshold value of the detector, so that reception of the reference beam and derivation of the reference plane are possible within these time windows.

Figure 8:
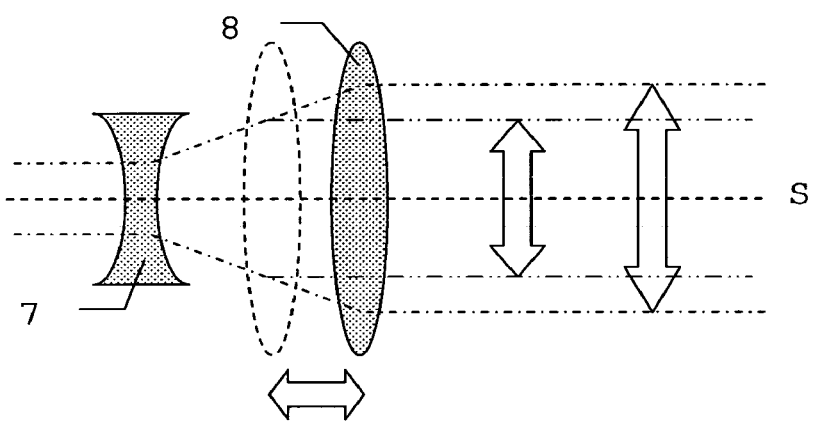
FIG. 8 shows a schematic diagram of a first working example of the optical system of a reference beam generator according to the invention.

A first working example of the optical system of a reference beam generator according to the invention is shown schematically in FIG. 8. The optical system varies the intensity in the solid angle covered by the reference beam as a function of time by changing the beam cross-section in one dimension, for example in the vertical direction. For this purpose, the optical system has a diverging lens 7, for producing a divergent beam, downstream of which is arranged a collecting lens 8 which is longitudinally displaceable in the direction of the optical axis. In this example, the collecting lens 8 is in the form of an aspherical lens, so that the divergent beam is always collimated within the available latitude of movement. By configuring the diverging lens 7 as a cylindrical lens, beam divergence takes place only in one direction so that, by changing the distance from diverging lens 7 to collecting lens 8, the beam cross-section is increased and reduced in size. As a result of the collimation of the laser beam S, the maximum divergence thereof is correlated with the lens size, so that in general only small maximum expansions are possible.

Figure 9:
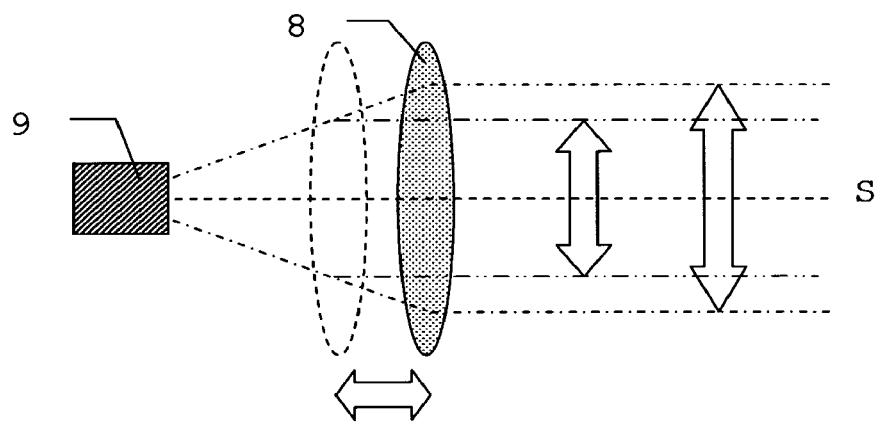
FIG. 9 shows a schematic diagram of a second working example of the optical system of a laser beam generator according to the invention.

FIG. 9 shows a schematic diagram of a second working example of the optical system of a reference beam generator according to the invention, in which the intrinsically present divergence of a beam source 9 is utilized. In another manner analogous to the first working example, the distance from a collecting lens 8 to the beam source 9 is varied and the beam cross-section of the laser beams S is thus changed.

Figure 10:
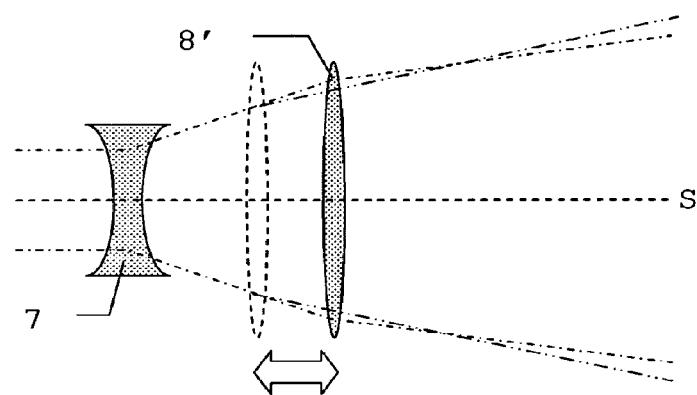
FIG. 10 shows a schematic diagram of a third working example of the optical system of a reference beam generator according to the invention.

In a third working example illustrated in FIG. 10, the divergence of a beam is only modified but not eliminated by collimation, so that a first opening angle of the emission is continuously varied. Similarly to FIG. 8, the optical system likewise has a diverging lens 7 for producing a divergent beam, downstream of which is arranged a collecting lens 8' which is longitudinally displaceable in the direction of the optical axis. In this working example, however, the collecting lens 8' is formed in such a way that, within the available latitude of movement, the divergent beam is modified with regard to its divergence but not completely collimated, which can be realized, for example, by a spherical lens. As a result of the change in the distance from diverging lens 7 to collecting lens 8', the beam cross-section can be increased and reduced in size, the configuration of the diverging lens 7 and optionally also of the collecting lens 8' as the cylindrical lens producing beam divergence in only one direction. Owing to the still existing divergence of the laser beam S, the maximum divergence thereof is not correlated with the lens size. By using suitable lenses in each case, for example astigmatic lenses, the characteristic of the beam cross-section and its variation as a function of time can be adapted.

Figure 11:
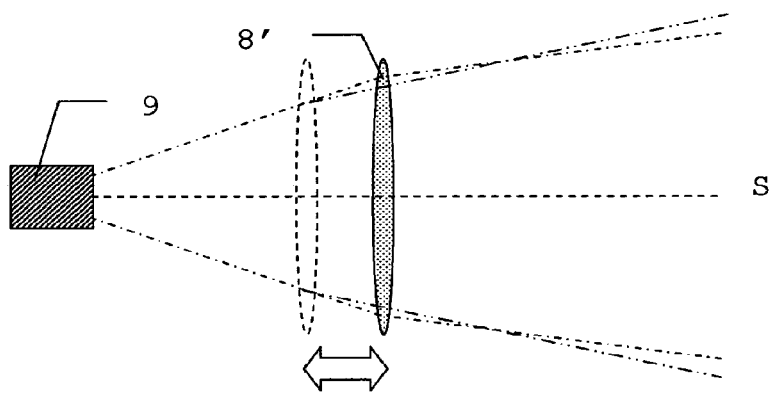
FIG. 11 shows a schematic diagram of a fourth working example of the optical system of a reference beam generator according to the invention.

FIG. 11 shows a schematic diagram of a fourth working example analogous to the third working example and utilizing a source divergence of a beam source 9.

Figure 12:
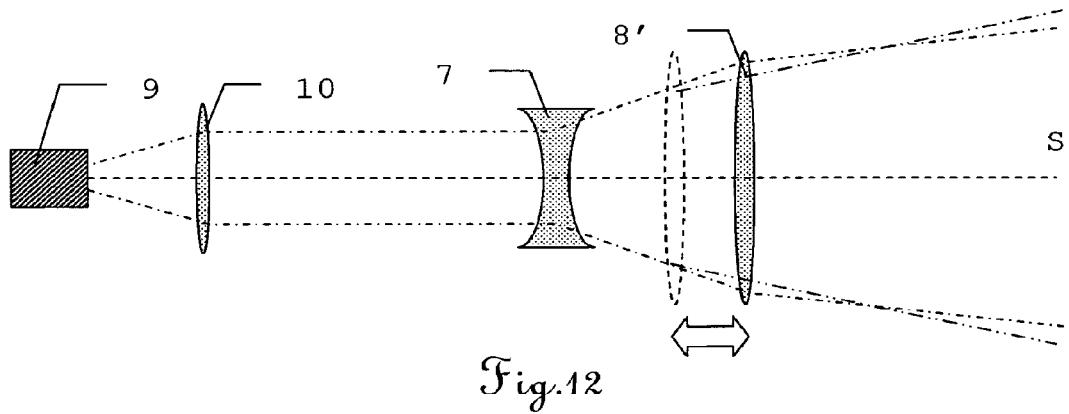
FIG. 12 shows a schematic diagram of a fifth working example of the optical system of a reference beam generator according to the invention.

A total optical system comprising beam source 9, collimator lens 10 and downstream optical system with a diverging lens 7 and moveable collecting lens 8' according to FIG. 10 is shown in FIG. 12 as a fifth working example of the optical system of a reference beam generator according to the invention.

Figure 13:
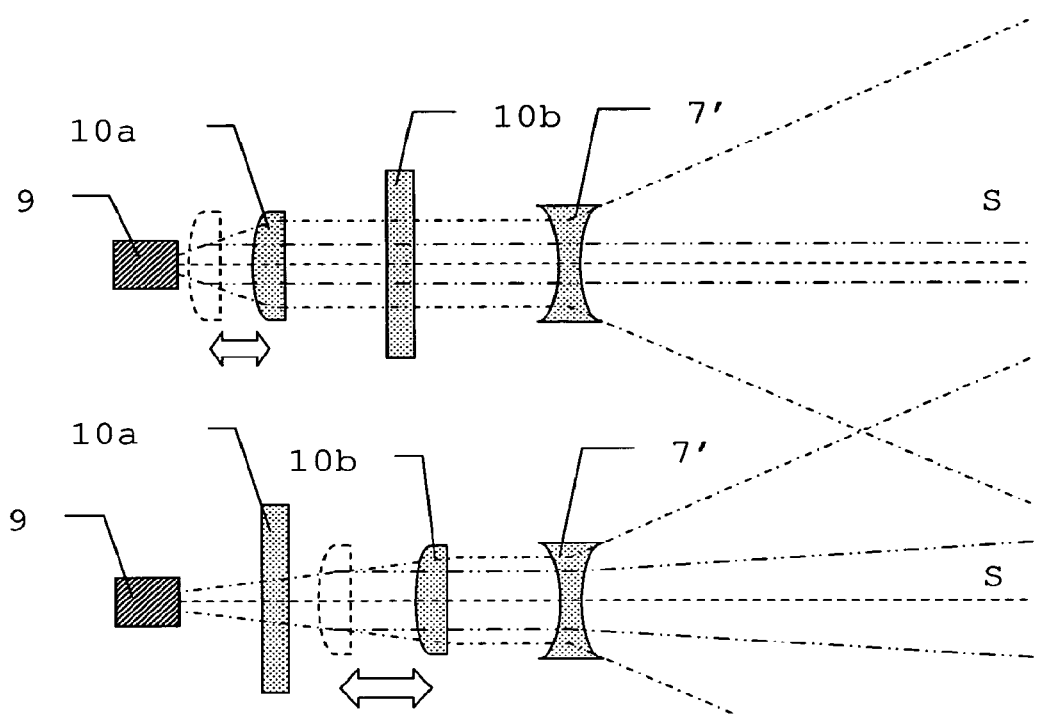
FIG. 13 shows a schematic diagram of a sixth working example of the optical system of a reference beam generator according to the invention.

The independent variability of the beam cross-section with two axes oriented perpendicularly to one another and with a variation of a first and second opening angle of the emission is shown schematically in FIG. 13 for a sixth working example of the optical system of a reference beam generator according to the invention. The two diagrams show the same optical system, the upper figure being rotated through 90° relative to the lower figure, so that the optical system is shown at the top in plan view and at the bottom in side view.

In this working example, the natural anisotropic divergence of a beam source 9 is utilized and the beam is collimated by a downstream first lens 10a in only a first direction, so that the divergence is retained in the second direction. The collimation of this second direction is effected by a second lens 10b. Both first lens 10a and second lens 10b can be moved in a relative manner along the optical axis. Arranged downstream of both lenses is a diverging lens 7' which is, for example, spherical. As a result of the respective relative movement of the first lens 10a and of the second lens 10b, the beam cross-section at the diverging lens 7' and hence the resulting divergence of the laser beam S are changed. A tailored periodic change in the relative positions of first lens 10a and second lens 10b leads to corresponding changes in the beam cross-section in two directions perpendicular to one another.

The working examples shown in FIGS. 8-13 can of course be configured by means of components of the reflective optical system and, for example, can use a mirror which is longitudinally displaceable in the direction of the optical axis. Moreover, the components, such as, for example, the lenses, are represented purely as functional elements. In particular, individual components can also consist of combined parts for achieving the overall functionality. Similarly, holograms or components of gradient optics can be used according to the invention in transmission or reflection.

Figure 14:
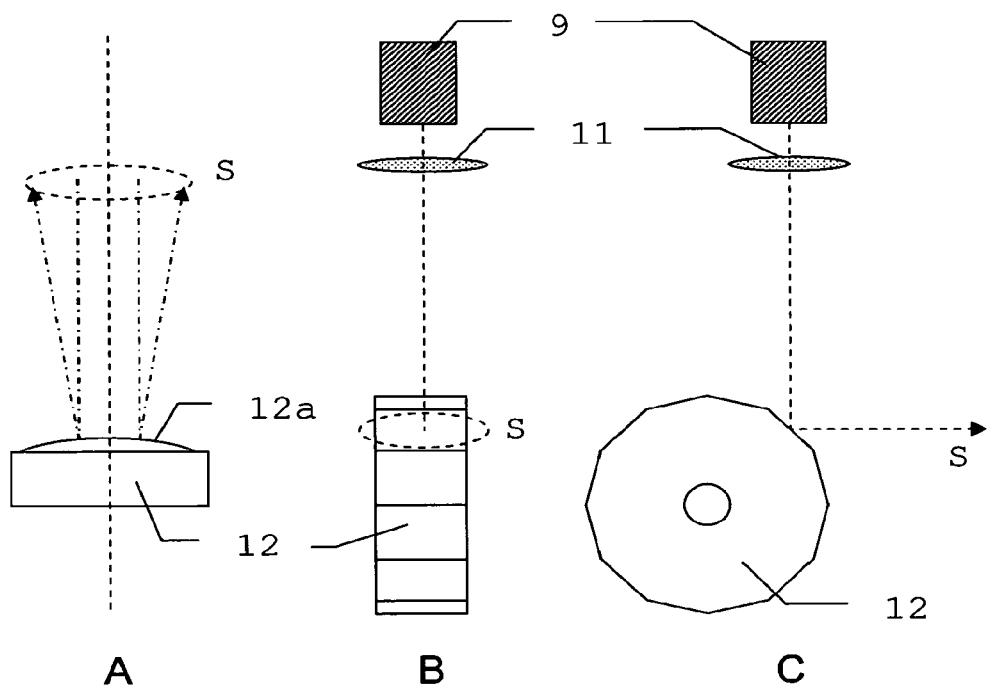
FIG. 14 A-C show a schematic diagram of a seventh working example of the optical system of a reference beam generator according to the invention and FIG. 15 shows a schematic diagram of an eighth working example of the optical system of a reference beam generator according to the invention.

FIG. 14A-C show a schematic diagram of a seventh working example of the optical system of a reference beam generator according to the invention. For changing the beam cross-section, a mechanically moveable mirror surface 12a is used, such as one which has, for example, a scanner wheel 12. Radiation is emitted by a beam source 9 and collimated by a collimator lens 11 and fed to the scanner wheel 12. Here, FIG. 14B shows a front view and FIG. 14C a side view of the system. The mirror surface 12a of the individual facettes of the scanner wheel 12 has a curvature with a radius of curvature which is variable in the direction of movement, said radius varying cyclically in particular in the direction of movement so that the first opening angle of the electromagnetic reference beam is variable. As is evident for the scanner wheel facet shown in FIG. 14A, the opening angle of the laser beam S is dependent on the radius of curvature of the mirror surface 12A. By movement of the scanner wheel 12, the radius of curvature and hence the beam cross-section are continuously changed.

Figure 15:
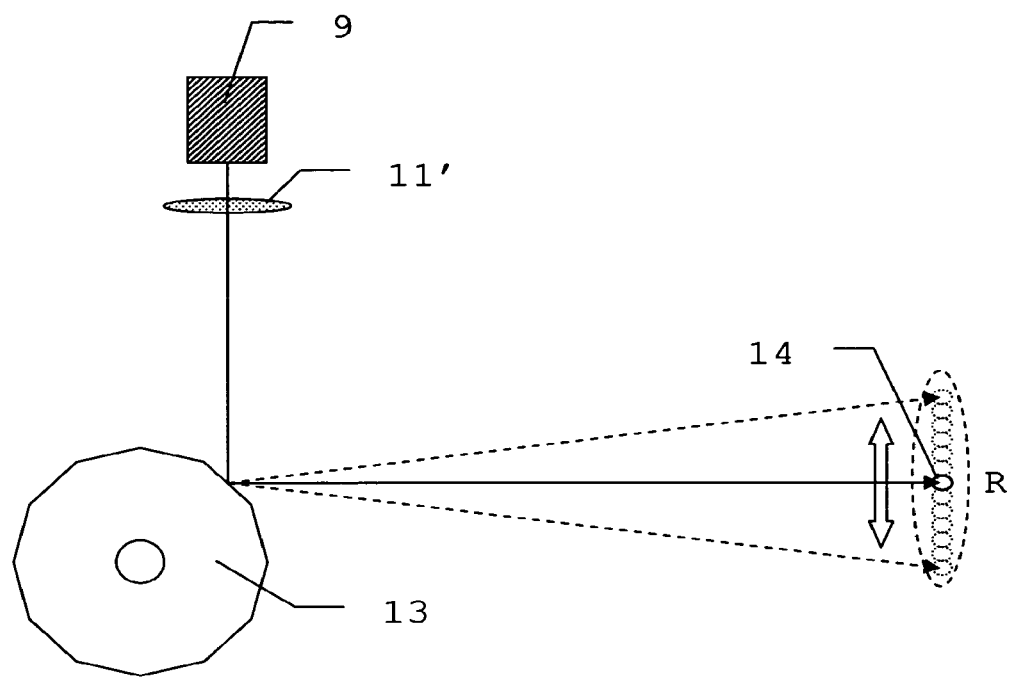

An eighth working example of the optical system of a reference beam generator according to the invention is shown schematically in FIG. 15. In this working example, the optical system varies the intensity in the solid angle covered by the reference beam as a function of time in such a way that a laser emission produced by a beam source 9 and shaped via an optical system 11' and having a small cross-section is moved as laser point 14 up and down within a solid angle region R so that this region is completely covered over a full period. A scanner wheel 13 customary for line scanners can advantageously be used for scanning the solid angle region R.

I claim:

1. A reference beam generator for producing an electromagnetic reference beam, comprising:
   a radiation source for producing electromagnetic radiation; and
   an optical system for the emission of the electromagnetic radiation as a reference beam, the optical system being configured to vary the intensity in the solid angle covered by the reference beam as a function of time,
   wherein the optical system varies at least one first divergence opening angle of the electromagnetic reference beam as a function of time, and
   wherein the first divergence opening angle is an angle between two rays of the electromagnetic radiation that define an outer envelope of the electromagnetic radiation in a reference plane that is parallel to a propagation direction of the electromagnetic radiation.

2. A reference beam generator according to claim 1, wherein the optical system has a lens which is longitudinally displaceable in the direction of the optical axis or a mirror which is longitudinally displaceable.

3. A reference beam generator according to claim 1, wherein the optical system has a mechanically moveable mirror surface.

4. A reference beam generator according to claim 3, wherein the mirror surface has a curvature with a radius of curvature which is variable in the direction of movement.

5. A reference beam generator according to claim 3, wherein the mirror surface has a curvature with a radius of curvature which is variable in the direction of movement with a radius of curvature varying cyclically in the direction of movement so that the first opening angle of the electromagnetic reference beam is variable.

6. A reference beam generator according to claim 1, wherein the optical system has a mechanically moveable mirror surface that includes a scanner wheel.

7. A reference beam generator according to claim 1, wherein the optical system varies the first divergence opening angle sinusoidally as a function of time.

8. A reference beam generator for producing an electromagnetic reference beam, comprising:
   a radiation source for producing electromagnetic radiation; and
   an optical system for the emission of the electromagnetic radiation as a reference beam, the optical system being configured to vary the intensity in the solid angle covered by the reference beam as a function of time by varying at least one first divergence opening angle of the electromagnetic reference beam sinusoidally as a function of time,
   wherein the optical system has a mechanically moveable mirror surface and wherein the mirror surface has a curvature with a radius of curvature which is variable in the direction of movement.

9. A reference beam generator for producing an electromagnetic reference beam, comprising:
- a radiation source for producing electromagnetic radiation; and
- an optical system for the emission of the electromagnetic radiation as a reference beam, the optical system being configured to vary the intensity in the solid angle covered by the reference beam as a function of time by varying at least one first divergence opening angle of the electromagnetic reference beam sinusoidally as a function of time,
- wherein the optical system has a mechanically moveable mirror surface and wherein the mirror surface has a curvature with a radius of curvature which is variable in the direction of movement with the radius of curvature varying cyclically in the direction of movement so that the first opening angle of the electromagnetic reference beam is variable.

* * * * *